United States Patent
Uji et al.

(10) Patent No.: US 11,412,098 B2
(45) Date of Patent: Aug. 9, 2022

(54) CABINET AND IMAGE FORMING SYSTEM

(71) Applicants: Kentaro Uji, Kanagawa (JP); Ryuta Kaneda, Kanagawa (JP); Masahiro Ishida, Kanagawa (JP)

(72) Inventors: Kentaro Uji, Kanagawa (JP); Ryuta Kaneda, Kanagawa (JP); Masahiro Ishida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/117,467

(22) Filed: Dec. 10, 2020

(65) Prior Publication Data
US 2021/0203799 A1    Jul. 1, 2021

(30) Foreign Application Priority Data

Dec. 25, 2019    (JP) .............................. JP2019-233779

(51) Int. Cl.
*H04N 1/04*    (2006.01)
*H04N 1/00*    (2006.01)

(52) U.S. Cl.
CPC ..... *H04N 1/00533* (2013.01); *H04N 1/00588* (2013.01); *H04N 1/00591* (2013.01); *H04N 1/00631* (2013.01)

(58) Field of Classification Search
CPC ........... H04N 1/00533; H04N 1/00588; H04N 1/00591; H04N 1/00631
USPC ................. 358/1.1–1.18, 474, 498
See application file for complete search history.

(56) References Cited

U.S. PATENT DOCUMENTS

| 5,715,500 | A | 2/1998 | Nakazato et al. |
| 2002/0024590 | A1* | 2/2002 | Pena .................. G06Q 20/4014 348/14.08 |
| 2004/0262379 | A1* | 12/2004 | Gomes .................. G07F 17/248 235/379 |
| 2016/0334747 | A1 | 11/2016 | Wakabayashi et al. |
| 2019/0361381 | A1 | 11/2019 | Ishida |
| 2019/0361385 | A1 | 11/2019 | Ishida et al. |
| 2020/0073320 | A1 | 3/2020 | Ishida |
| 2020/0171866 | A1 | 6/2020 | Ishida et al. |

FOREIGN PATENT DOCUMENTS

| JP | 63-014252 | 1/1988 |
| JP | 8-165034 | 6/1996 |
| JP | 2003-101705 | 4/2003 |
| JP | 2005-094082 | 4/2005 |
| JP | 2011-175258 | 9/2011 |

* cited by examiner

*Primary Examiner* — Gabriel I Garcia
(74) *Attorney, Agent, or Firm* — Harness, Dickey & Pierce, P.L.C.

(57) ABSTRACT

A cabinet includes a first area and a second area arranged in a horizontal direction, an image forming apparatus, and a reading device. The image forming apparatus is accommodated in the first area and forms an image on a sheet and ejects the sheet with the image. The reading device is accommodated in the second area of the cabinet and reads an image of a document. At least a part of the reading device is pulled out from an internal space of the cabinet in a direction orthogonal to the horizontal direction in which the first area and the second area are arranged in a horizontal plane.

9 Claims, 13 Drawing Sheets

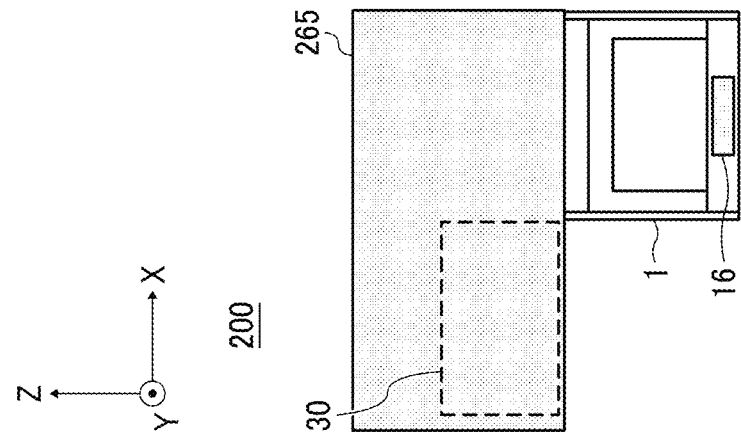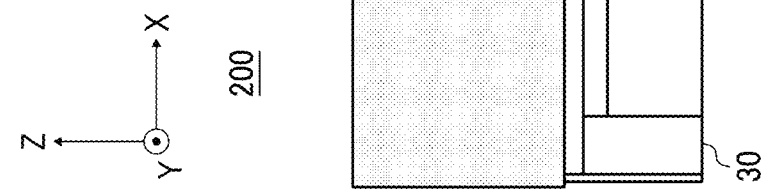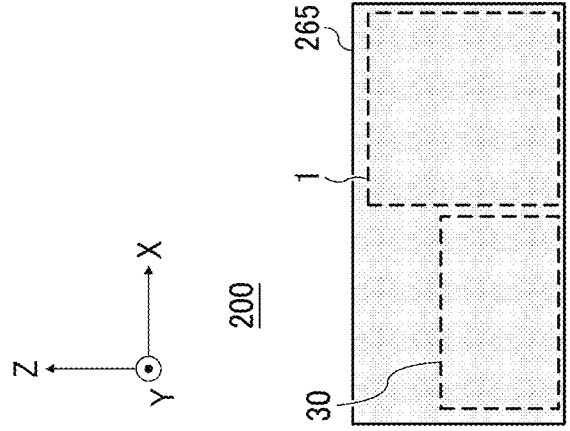

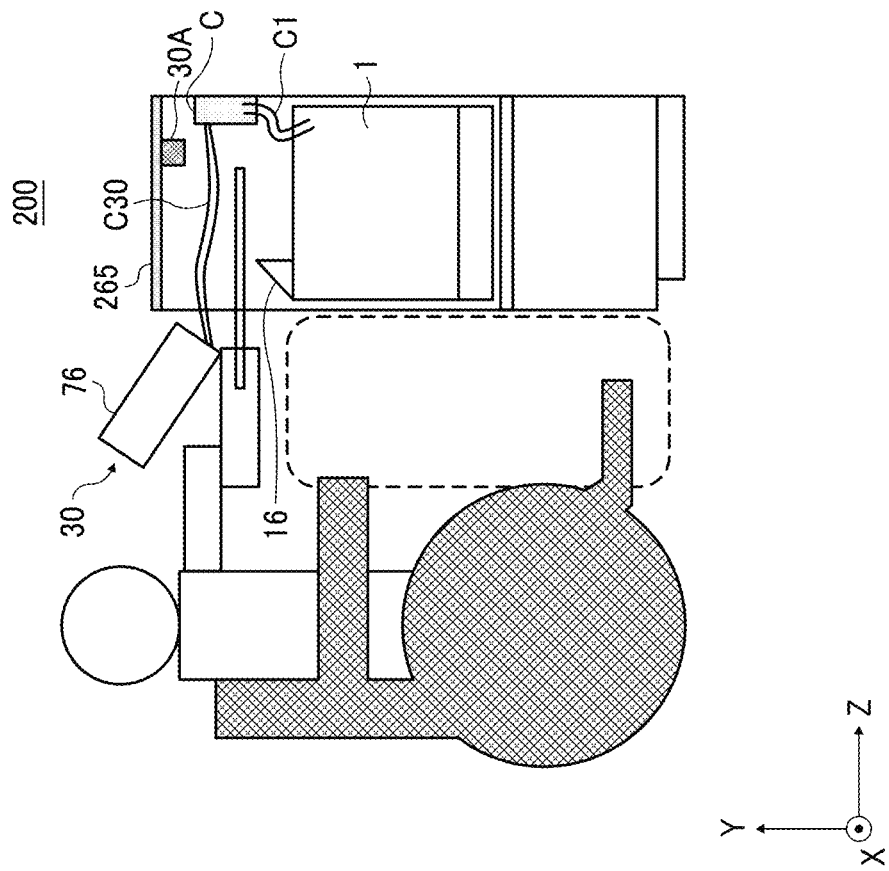
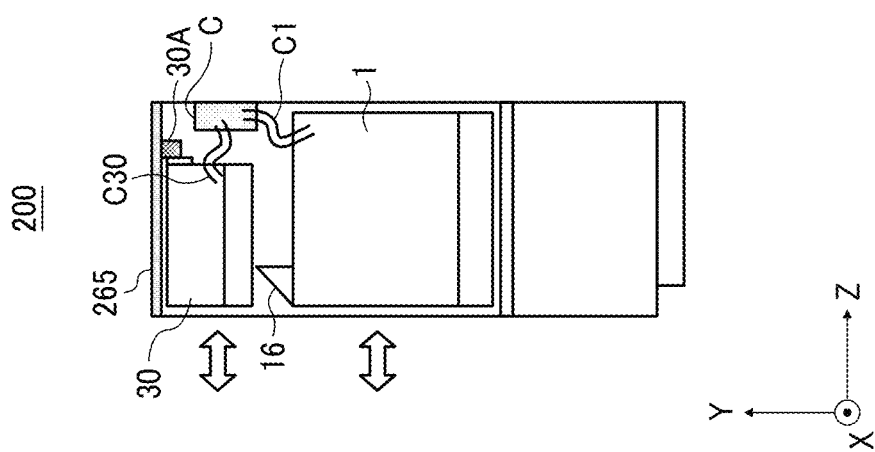

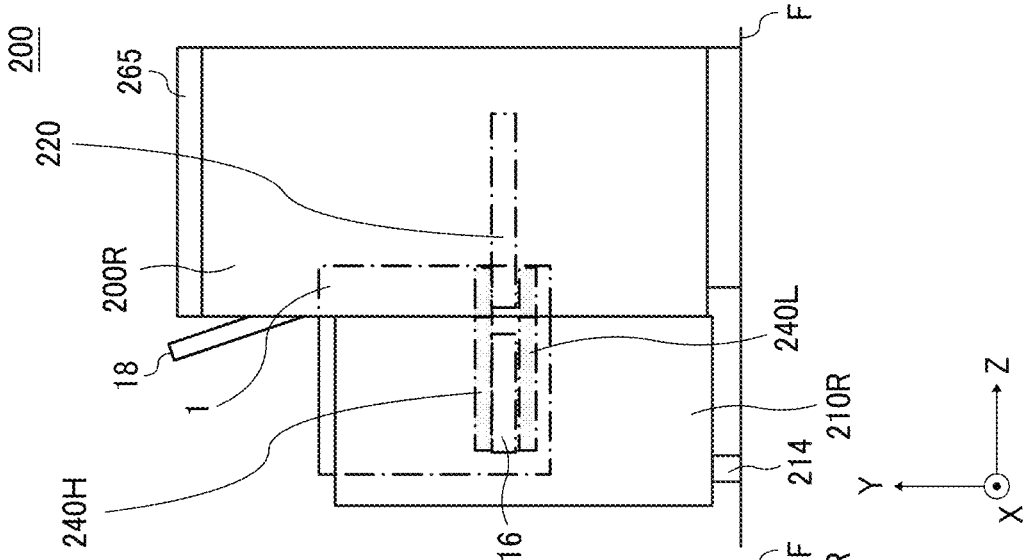
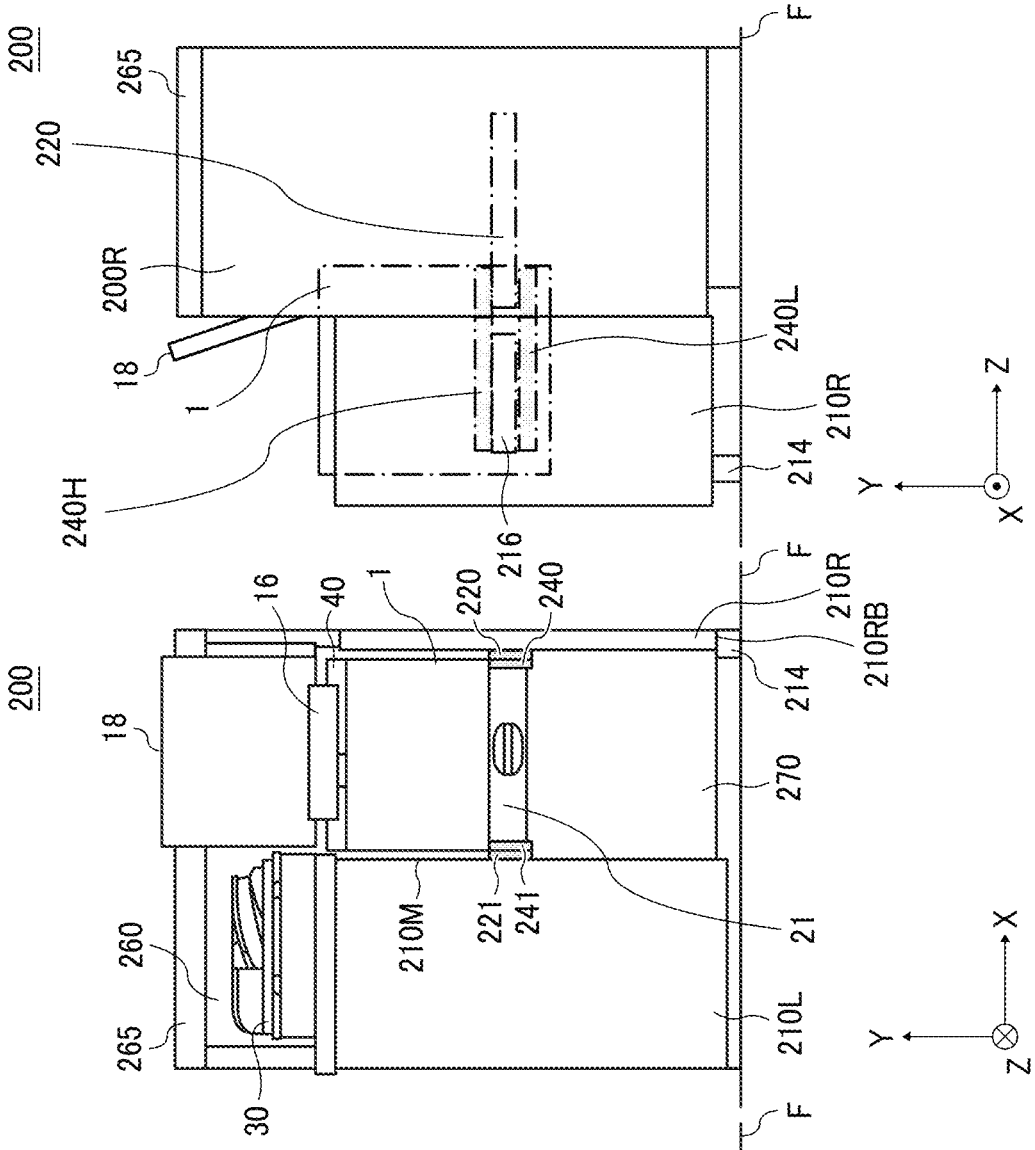
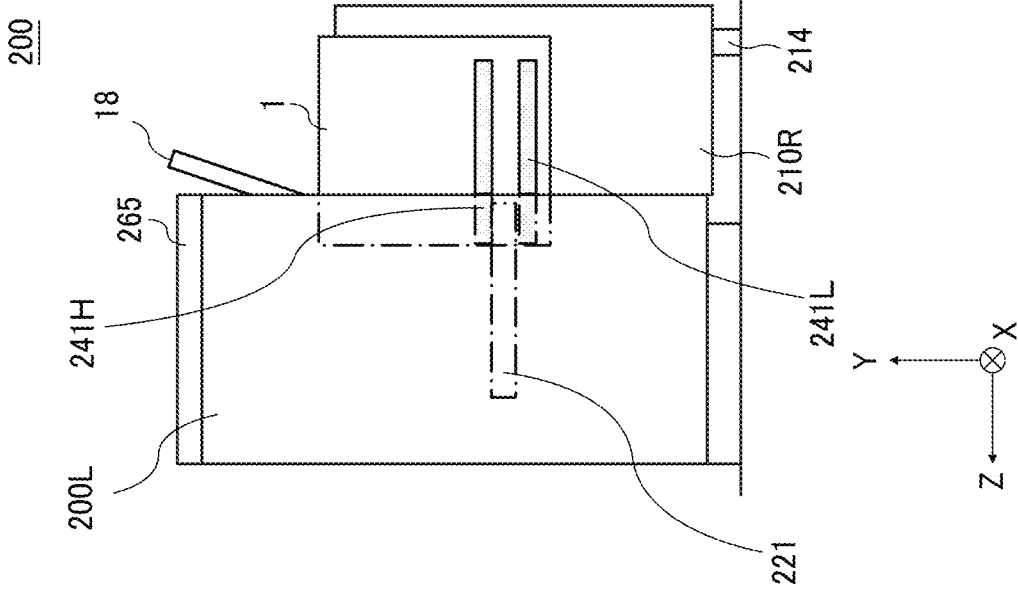

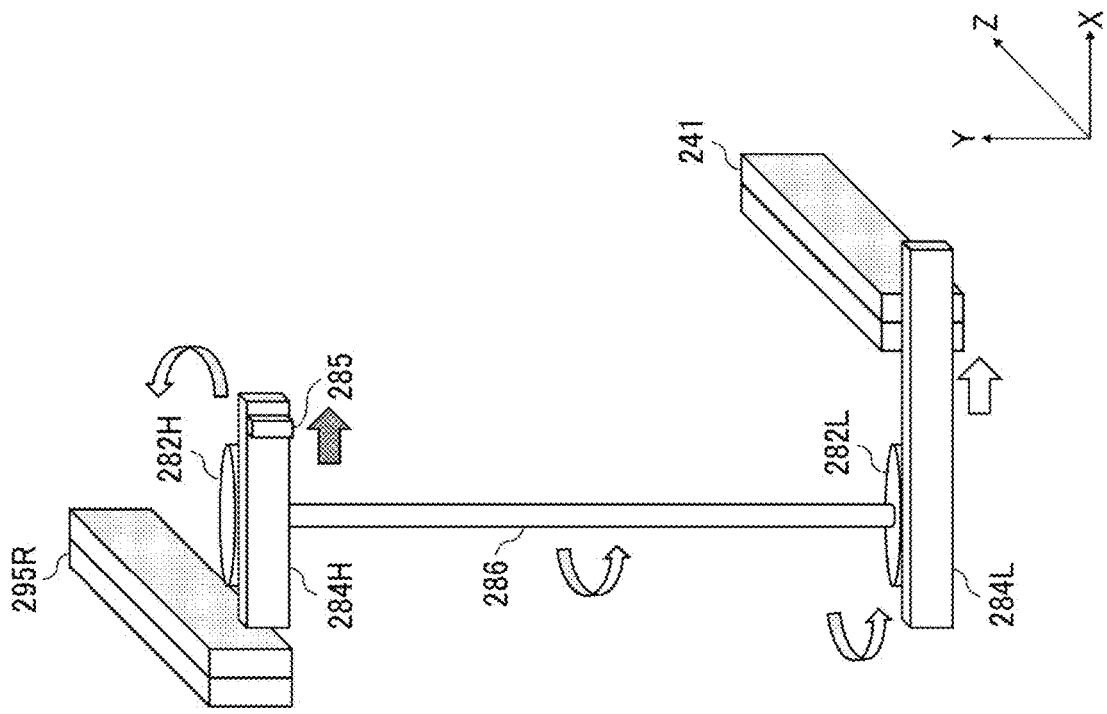
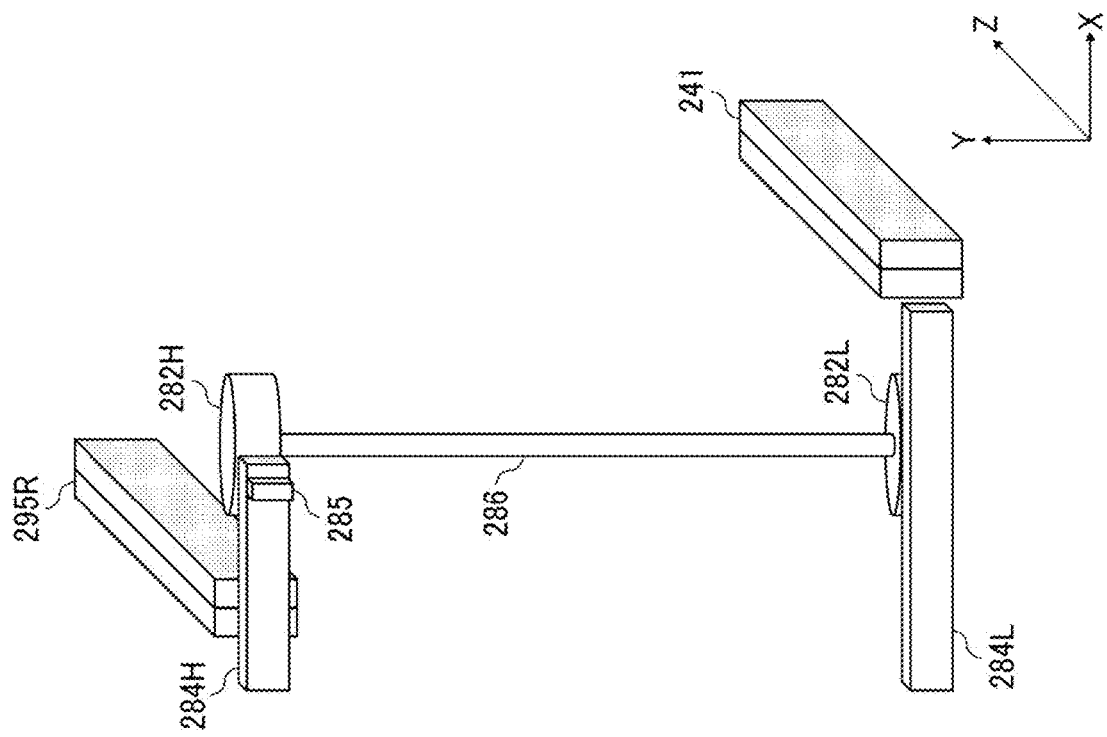

CABINET AND IMAGE FORMING SYSTEM

CROSS-REFERENCE TO RELATED APPLICATION

This patent application is based on and claims priority pursuant to 35 U.S.C. § 119(a) to Japanese Patent Application No. 2019-233779, filed on Dec. 25, 2019, in the Japan Patent Office, the entire disclosure of which is hereby incorporated by reference herein.

BACKGROUND

Technical Field

Embodiments of the present disclosure relate to a cabinet that accommodates an image forming apparatus and an image forming system.

Description of the Related Art

There is known an image forming apparatus that includes a plurality of photoconductors, a light emitting diode (LED), a developing device, a developer cartridge, an intermediate transfer member, a fixing device, a support member, a sheet tray, a sheet conveyance path, and a support member opening. The plurality of photoconductors are disposed in parallel on a surface parallel to the plurality of photoconductors. The LED is disposed in a vicinity of the plurality of photoconductors. The support member supports the fixing device, the plurality of photoconductors, the developing device, and the LED. The support member is freely pulled out from the apparatus body in a horizontal direction perpendicular to an axis direction of the photoconductors. The sheet tray stacks sheets of paper. The sheet conveyance path is freely openable in a direction in which the support member is removed from the apparatus body. The support member includes the support member opening. The plurality of photoconductors is attachable and detachable through the support member opening in the axis direction of the photoconductors that is a direction substantially perpendicular to the direction in which the support member is pulled out with respect to the photoconductors.

SUMMARY

In an aspect of the present disclosure, a cabinet includes a first area and a second area arranged in a horizontal direction, an image forming apparatus, and a reading device. The image forming apparatus is accommodated in the first area and forms an image on a sheet and ejects the sheet with the image. The reading device is accommodated in the second area of the cabinet and reads an image of a document. At least a part of the reading device is pulled out from an internal space of the cabinet in a direction orthogonal to the horizontal direction in which the first area and the second area are arranged in a horizontal plane.

In another aspect of the present disclosure, an image forming system includes an image forming apparatus and a cabinet. The cabinet accommodates the image forming apparatus. The cabinet includes a first area and a second area arranged in a horizontal direction, the image forming apparatus in the first area, and a reading device in the second area. The reading device reads an image of a document. At least a part of the reading device is pulled out from the cabinet in a direction orthogonal to the horizontal direction in which the first area and the second area are arranged in a horizontal plane.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 7A, 7B, and 7C are top views of the cabinet of FIG. 1 in states in which the cabinet is in use;

FIG. 8A is a right side view of a state before the reading device is pulled out from the cabinet of FIG. 1;

FIG. 8B is a right side view of a state after the reading device has been pulled out from the cabinet of FIG. 1;

FIG. 9A is a left-side view, FIG. 9B is a front view, and FIG. 9C is a right-side view of a state in which the image forming apparatus is pulled out from the cabinet of FIG. 1;

FIGS. 13A and 13B are third schematic views of the lock mechanism of the cabinet of FIG. 1.

Figure 1:
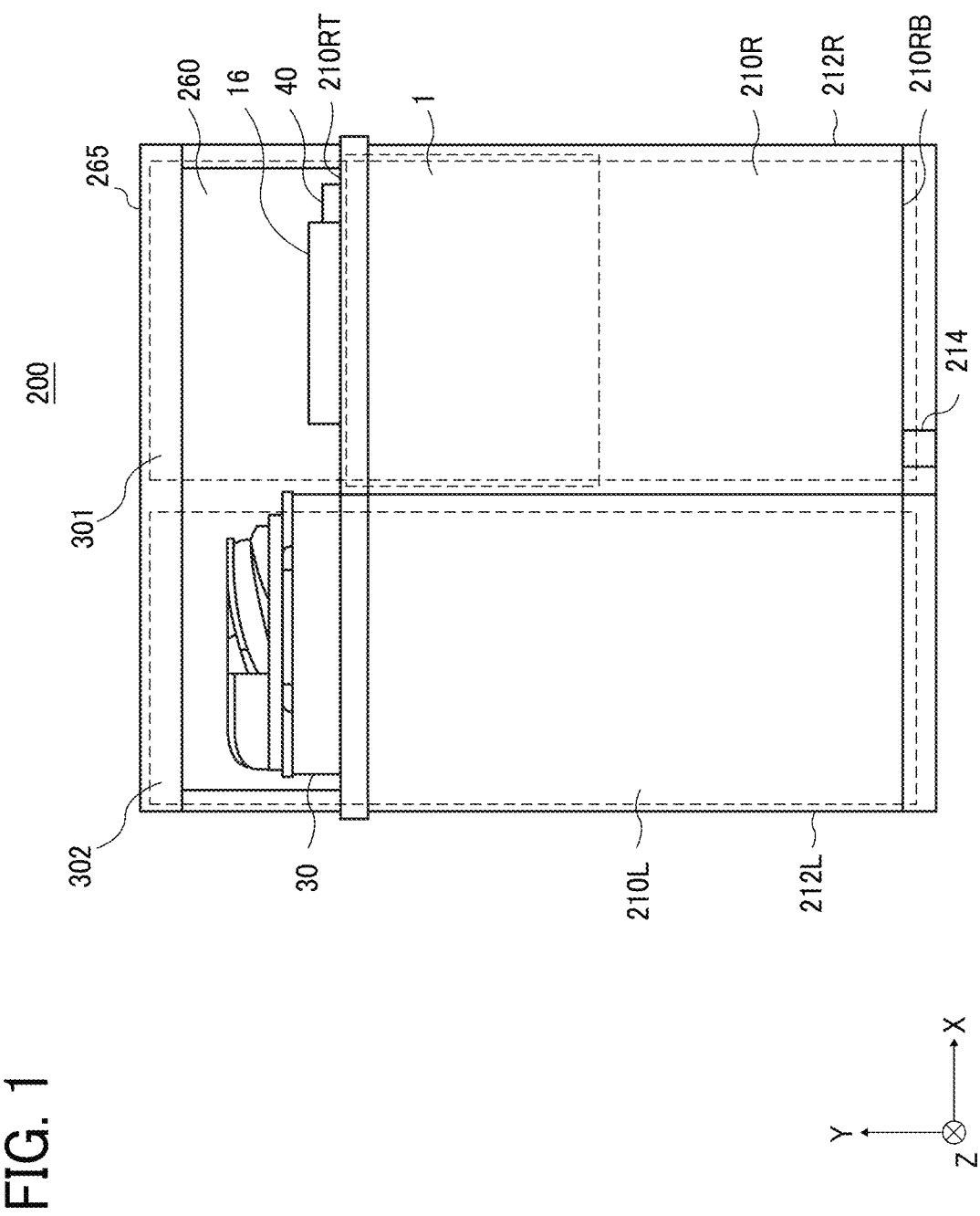
FIG. 1 is a front view of a cabinet according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a front view of a cabinet 200 according to an embodiment of the present disclosure. An X-axis direction illustrated in FIG. 1 is the width direction of the cabinet 200. A Y-axis direction is the height direction of the cabinet 200. A Z-axis direction is the depth direction of the cabinet 200.

The cabinet 200 includes a first area 301 and a second area 302 arranged in a horizontal direction when viewed from a front side (negative side in the Z-axis direction) of the cabinet 200. An image forming apparatus 1 that forms an image on a sheet of paper and ejects the sheet on which the image has been formed is accommodated in the first area 301 disposed on the right side (positive side in the X-axis direction) of the cabinet 200. A reading device 30 that reads an image of a document and sends image data to the image forming apparatus 1 is accommodated in the second area 302 disposed on the left side (negative side in the X-axis direction) of the cabinet 200. Here, the cabinet 200, the image forming apparatus 1, and the reading device 30 may be collectively referred to as an image forming system.

The cabinet 200 includes a top plate 265, a right door 210R, and a left door 210L. The right door 210R rotates around a vertical right shaft 212R to open an internal space of the first area 301. The left door 210L rotates around a vertical left shaft 212L to open an internal space of the second area 302. The right door 210R and the left door 210L are double doors.

Atop surface of the top plate 265 is made flat. Accordingly, an object can be placed on the top plate 265 and the top plate 265 may be used as a worktable.

In addition, the top plate 265 is formed to be larger than the size of the image forming apparatus 1 in the width direction (X-axis direction) and is disposed above the image forming apparatus 1 and the reading device 30 via an upper space 260.

An upper end 210RT of the right door 210R is formed so as to open the upper space 260 to the front side (negative side in the Z-axis direction) of the cabinet 200 in a state in which the right door 210R is closed. The image forming apparatus 1 includes an operation device 16 and a sheet ejection device 40. The operation device 16 receives an operation input to the image forming apparatus 1 and the reading device 30. The sheet ejection device 40 ejects a sheet on which an image has been formed and is disposed so as to face the upper space 260.

The sheet on which the image has been formed is ejected from the front side (negative side in the Z-axis direction) toward a rear side (positive side in the Z-axis direction) in the sheet ejection device 40. The upper space 260 has a sufficient space to easily take out ejected sheets stacked on the sheet ejection device 40.

Accordingly, in a state in which the right door 210R is closed, a user can access the upper space 260 to operate the operation device 16 and take out the sheets ejected from the image forming apparatus 1.

A lower end 210RB of the right door 210R is formed above a floor surface with a space between the floor surface and the lower end 210RB. A leg 214 such as a caster that contacts the floor surface is provided beneath the lower end 210RB.

In the present embodiment, since the image forming apparatus 1 is covered by the cabinet 200, the appearance of the design of the image forming apparatus 1 can be enhanced by eliminating joints of the exterior of the image forming apparatus 1, and reduction of noise generated by the image forming apparatus 1 can also be achieved. Thus, users do not feel uncomfortable even if the image forming apparatus 1 and the cabinet 200 are placed near a workspace of the users.

Further, in the present embodiment, the side (negative side in the Z-axis direction) on which the operation device 16 is disposed is the front side of the image forming apparatus 1. Operation of the reading device 30 by the user, that is, setting of a document and taking out of the document are also performed from the front side of the image forming apparatus 1 (negative side in the Z-axis direction).

Figure 2:
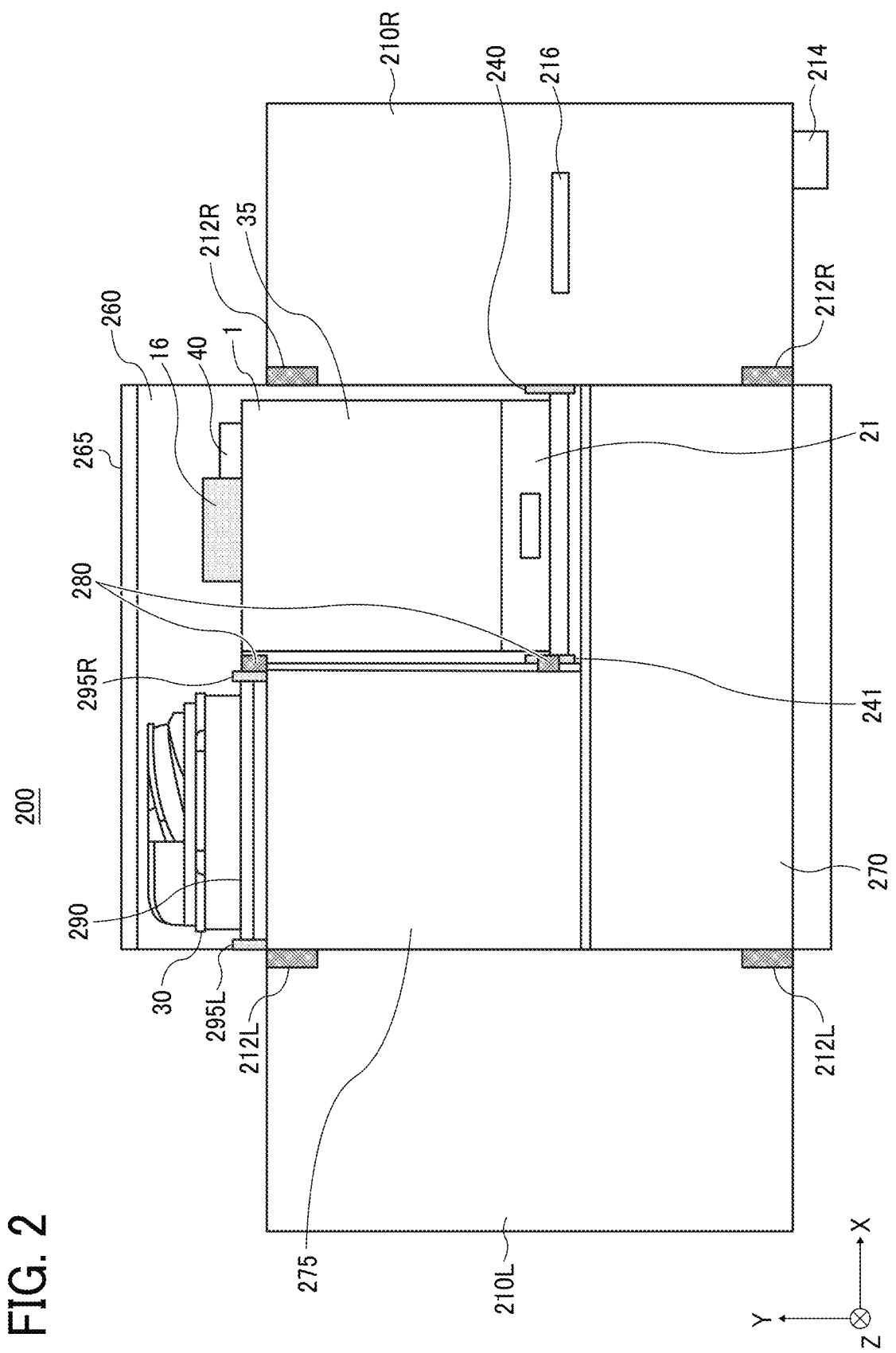
FIG. 2 is a front view of the cabinet of FIG. 1 in a state in which a right door and a left door are opened.

FIG. 2 is a front view of the cabinet 200 of FIG. 1 in a state in which the right door 210R and the left door 210L of the cabinet 200 are opened.

The cabinet 200 includes a lower space 270 and a storage space 275. The lower space 270 is formed below the image forming apparatus 1 accommodated in the cabinet 200. The storage space 275 is formed below the reading device 30 accommodated in the cabinet 200 and horizontally aligned with the image forming apparatus 1. The lower space 270 is formed below the storage space 275 so as to extend beyond the storage space 275. Consumables such as toner and sheets of paper are stored in the lower space 270 and the storage space 275.

The image forming apparatus 1 is operable even in a state in which an internal space of the cabinet 200 is opened by the right door 210R. The image forming apparatus 1 includes a guide-side right rail 240 at a lower right portion of the image forming apparatus 1 (on the positive side in the X-axis direction) and a guide-side left rail 241 at a lower left portion of the image forming apparatus 1 (on the negative side in the X-axis direction). The image forming apparatus 1 can be pulled out from the internal space of the cabinet 200 opened by the right door 210R to an external space of the cabinet 200 (on the front side in the Z-axis direction).

In addition, the image forming apparatus 1 includes a front cover 35 that opens an internal space of the image forming apparatus 1 and a sheet tray 21 on which sheets are stacked. The sheet tray 21 can be pulled out to the front side (negative side in the Z-axis direction) of the image forming apparatus 1.

A supporter (second fixed-side rail) 216 that supports the image forming apparatus 1, which is pulled out to the external space of the cabinet 200, is provided inside the right door 210R.

The reading device 30 is mounted on a mounting table 290. The mounting table 290 includes a right rail 295R on the right side (positive side in the X-axis direction) of the mounting table 290 and a left rail 295L on the left side of the mounting table 290 (negative side in the X-axis direction). The mounting table 290 can be pulled out to the front side (negative side in the Z-axis direction) of the cabinet 200 even in a state in which the left door 210L is closed. The direction in which the mounting table 290 and the reading device 30 are pulled out is a direction orthogonal to the direction in which the first area 301 and the second area 302 of FIG. 1 are arranged.

Further, the cabinet 200 includes lock mechanisms 280 at positions interfering with the right rail 295R provided on the mounting table 290 and the guide-side left rail 241 provided on the image forming apparatus 1. The lock mechanisms 280 allow one of the mounting table 290 and the image forming apparatus 1 to be pulled out and prevent the other from being pulled out. Details thereof will be described later.

In the present embodiment, even when the right door 210R or the left door 210L is opened, the image forming apparatus 1 can form an image on a sheet and eject the sheet on which the image has been formed to the sheet ejection device 40. Such a configuration can prevent the image forming apparatus 1 from stopping an image forming process every time the right door 210R or the left door 210L is opened, thus, preventing deterioration of workability in, e.g., supplying the sheets.

Figure 3:
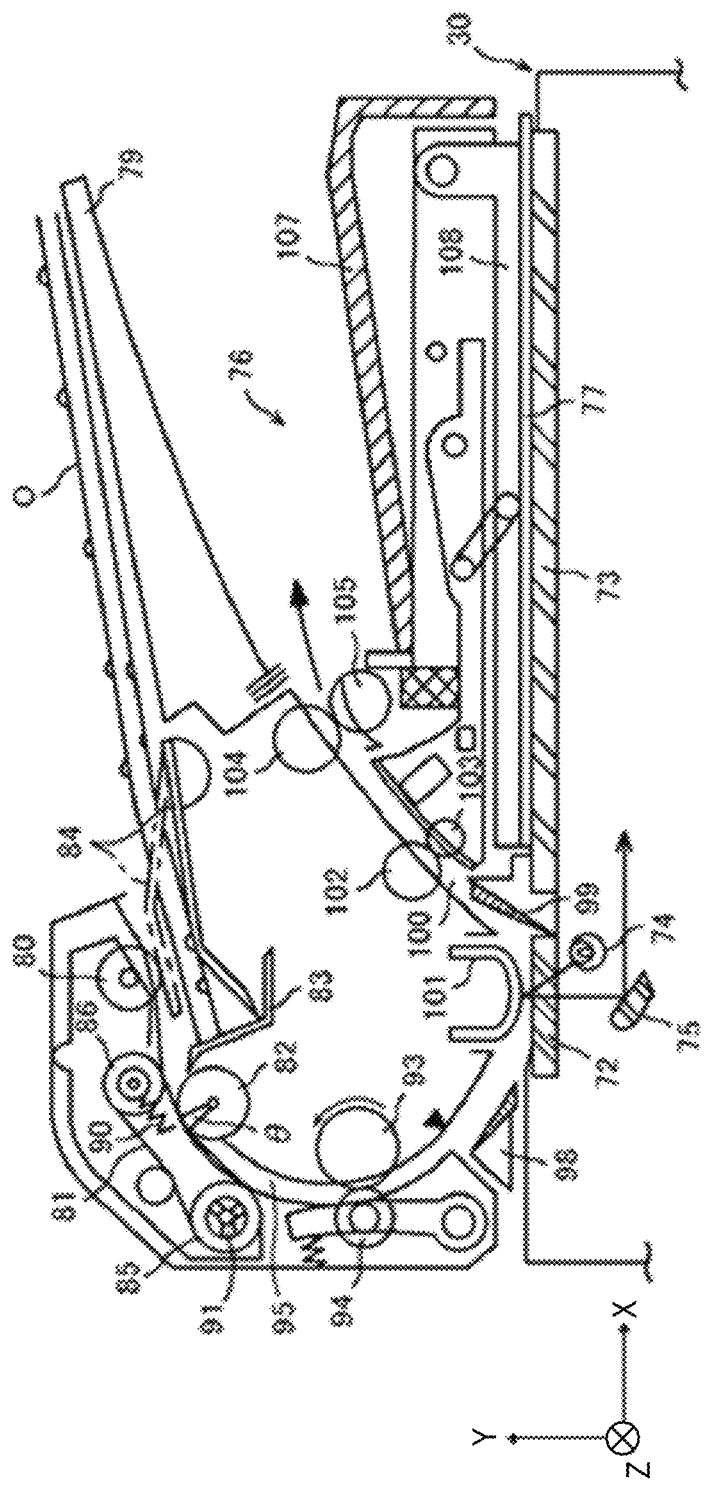
FIG. 3 is a cross-sectional view of a reading device illustrated in FIG. 1.

FIG. 3 is a cross-sectional view of the reading device 30 of FIG. 1.

A slit glass 72 (first reading position) and an exposure glass 73 (second reading position) are provided on an upper surface of the reading device 30. Below the slit glass 72 and the exposure glass 73, an exposure lamp 74 and a first mirror 75 as image readers are provided. The exposure lamp 74 and the first mirror 75 move in a lateral direction in FIG. 3 below the exposure glass 73 when reading a document placed on the exposure glass 73 (first reading mode), and stop below the slit glass 72 when reading a document on the slit glass 72. After a surface of the document is read with the exposure lamp 74 (second reading mode), reflected light is formed onto an imaging element such as a charge-coupled device (CCD) through the first mirror 75 and lenses.

An automatic document feeder (hereinafter, simply referred to as an ADF) 76 is mounted on the reading device 30. A reflection plate 77 that presses a document placed on the exposure glass 73 against the exposure glass 73 and serves as a white reference at the time of reading the document is provided on a lower surface of the ADF 76. The ADF 76 is coupled with the reading device 30 via a hinge, and is openable and closable with respect to the reading device 30.

A document table 79 is provided above the ADF 76, and a document bundle O including a plurality of documents is placed on the document table 79. The document bundle O placed on the document table 79 is fed by a calling roller 80 capable of contacting and separating from the original bundle O. Then, the original bundle O is separated by a separation belt 81 and a separation stop roller 82 and the separation belt 81 is pressed against and in contact with the separation stop roller 82 at an arbitrary angle θ.

The separation belt 81 is bridged between a driving roller 85 and a driven roller 86. The driven roller 86 is biased by a spring 90, and a predetermined amount of tensile force is applied to the separation belt 81 by the spring 90. A one-way clutch 91 is provided between the driving roller 85 and a shaft 85a. The driving roller 85 is driven to rotate clockwise by the clutch 91. The separation stop roller 82 rotates clockwise and an uppermost document is separated from the document bundle O fed between the separation belt 81 and the separation stop roller 82.

The document separated by the separation belt 81 and the separation stop roller 82 is reversed along a reverse passage 95 by a first conveyance roller 93 and a driven roller 94, which are on a driving side, and is conveyed toward the slit glass 72.

The first conveyance roller 93 and the driven roller 94 nip the separated document and convey the document to the slit glass 72 through a reverse guide 98. Then, the document is scooped up and conveyed by a reverse ejection guide 99 to a sheet ejection path 100. A reflection guide plate 101 is provided above the slit glass 72, and the reflection guide plate 101 serves as a white reference at the time of reading the document.

Then, the document conveyed to the sheet ejection path 100 is nipped and conveyed by a second conveyance roller (driver) 102 and a driven roller (conveyer) 103. The document is then nipped by a sheet ejection roller 104 and a driven roller 105, which are on the driving side, and is ejected outside from the sheet ejection path 100 onto the exterior cover 107. On the other hand, the reflection plate 77 that covers the exposure glass 73 is provided on a lower surface of a pressing plate 108. The pressing plate 108 presses the document placed on the exposure glass 73 against the exposure glass 73.

In the present embodiment, as described above, the document conveyance direction and the document scanning direction of the reading device 30 are the left-and-right direction (X-axis direction) when viewed from the front side (negative side in the Z-axis direction). A direction in which the ADF 76 receives the document is a direction in which the document is conveyed from the first area 301 toward the second area 302 (negative X-axis direction) illustrated in FIG. 1. A direction in which the ADF 76 ejects the document is a direction in which the document is ejected from the second area 302 toward the first area 301 (positive side in the X-axis direction).

Figure 4:
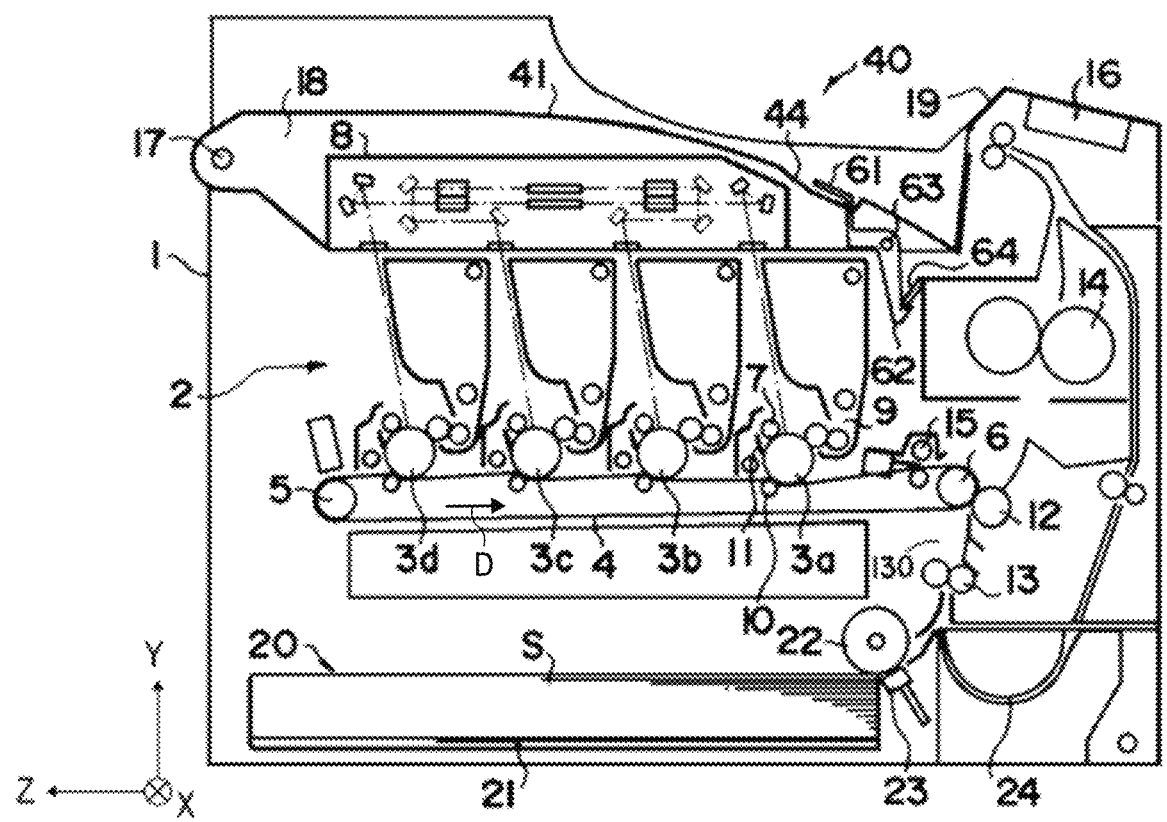
FIG. 4 is a cross-sectional view of an image forming apparatus illustrated in FIG. 1.

FIG. 4 is a cross-sectional view of the image forming apparatus 1 of FIG. 1.

The image forming apparatus 1 is a tandem-type color image forming apparatus. The image forming apparatus 1 includes an image forming device 2 and a sheet feeder 20. The image forming device 2 is disposed in a center of the image forming apparatus 1. The sheet feeder 20 feeds a sheet on which an image is formed by the image forming device 2 and is disposed in a lower portion of the image forming apparatus 1.

The image forming device 2 includes a plurality of drum-shaped photoconductors $3a$, $3b$, $3c$, and $3d$ as image bearers, and toner images of different colors are formed on the respective photoconductors $3a$, $3b$, $3c$, and $3d$. In an example of FIG. 4, a yellow toner image, a cyan toner image, a magenta toner image, and a black toner image are formed on surfaces of the photoconductors $3a$, $3b$, $3c$, and $3d$, respectively. The photoconductors $3a$ to $3d$ are arranged in parallel at a predetermined interval with each other. An intermediate transfer belt 4 as an intermediate transfer member is arranged to face lower portions of the photoconductors $3a$ to $3d$. Although a drum may be used as the intermediate transfer member, an endless belt wound around a plurality of support rollers 5 and 6 and driven in a direction indicated by arrow D is used in the example of FIG. 4.

A laser scanning unit (LSU) 8 is also provided above the photoconductors $3a$ to $3d$. Around each of the photoconductors $3a$ to $3d$, a charger 7, a developing device 9, a transfer device 10, and a cleaning device 11 are provided. Each charger 7 charges a surface of a corresponding one of the photoconductors $3a$ to $3d$. The LSU 8 irradiates the surfaces of the photoconductors $3a$ to $3d$ with laser beam based on image data. Each developing device 9 visualizes an electrostatic latent image formed on the surface of the corresponding one of the respective photoconductors $3a$ to $3d$ by exposure. Each transfer device 10 is disposed facing the corresponding one of the photoconductors $3a$ to $3d$ via the intermediate transfer belt 4. Each cleaning device 11 removes and collects toner remaining on the surface of the corresponding one of the photoconductors $3a$ to $3d$ after the electrostatic latent image has been transferred to the intermediate transfer belt 4.

When image formation is started in the image forming apparatus 1, the photoconductors $3a$ to $3d$ are driven to rotate in the clockwise direction in FIG. 4. At this time, the surface of each of the photoconductors $3a$ to $3d$ is charged to a predetermined polarity by the charger 7. Next, the charged surfaces of the photoconductors 3a to 3d are irradiated with laser beams based on image data from the LSU 8. Thus, electrostatic latent images are formed on the photoconductors 3a to 3d. The electrostatic latent images formed on the surfaces of the photoconductors 3a to 3d are visualized as toner images by the developing devices 9, and the toner images are transferred onto the intermediate transfer belt 4 by the transfer devices 10.

At the time of color image formation, the above-described image forming operation is performed on all the photoconductors 3a to 3d. Thus, a yellow toner image, a cyan toner image, a magenta toner image, and a black toner image formed on the photoconductors 3a, 3b, 3c, and 3d, respectively, are sequentially transferred onto the intermediate transfer belt 4 in an overlapping manner. In the image forming apparatus 1, a secondary transfer roller 12 is disposed to face the support roller 6 with the intermediate transfer belt 4 interposed between the secondary transfer roller 12 and the support roller 6.

On the other hand, the sheet feeder 20 disposed below the image forming device 2 is provided with the sheet tray 21, a sheet feeding roller 22, a friction pad 23, a re-conveyance path 24, and the like. The sheet tray 21 stacks sheets S made of, e.g., transfer paper or resin film. The sheet feeding roller 22 feeds the sheets S stacked on the sheet tray 21. The friction pad 23 as a separator separates the multi-fed sheets S into a single sheet. The re-conveyance path 24 is used at the time of double-sided image formation. The sheet tray 21 according to the present embodiment can be pulled out from the image forming apparatus 1 to the front side (the negative side in the Z-axis direction) of the image forming apparatus 1 to supply the sheets S and the like. At this time, the friction pad 23 and the re-conveyance path 24 are pulled out together with the sheet tray 21. However, the sheet feeding roller 22 remains inside the image forming apparatus 1.

The sheet S fed from the sheet feeder 20 is fed toward a conveyance path 130, and a leading end of the sheet S is thrust against a stopped registration roller pair 13. After the sheet S is aligned in such an arrangement, the registration roller pair 13 resumes rotation at such a timing that the color toner image formed on the intermediate transfer belt 4 coincides with the leading end of the sheet S at a secondary transfer unit provided with the secondary transfer roller 12, and feeds the sheet S toward the secondary transfer unit.

The sheet S to which an unfixed toner image has been transferred in the secondary transfer unit is sent to the fixing device 14. After the unfixed toner image has been fixed to the sheet S, the sheet S is ejected to the sheet ejection device 40 provided in an upper portion of the image forming apparatus 1. Transfer residual toner adhering to the surface of the intermediate transfer belt 4 after the toner image transfer is removed by a belt cleaner 15.

An upper frame 18 as an upper frame is provided in the upper portion of the image forming apparatus 1. An upper cover supported by the upper frame 18 is used as a sheet stacking surface 41 of the sheet ejection device 40.

The upper frame 18 supports the LSU 8, which is a part of the image forming device, in a lower portion of the upper frame 18. The upper frame 18 is openable upward about a hinge 17 provided at a rear end of the image forming apparatus 1.

Figure 5:
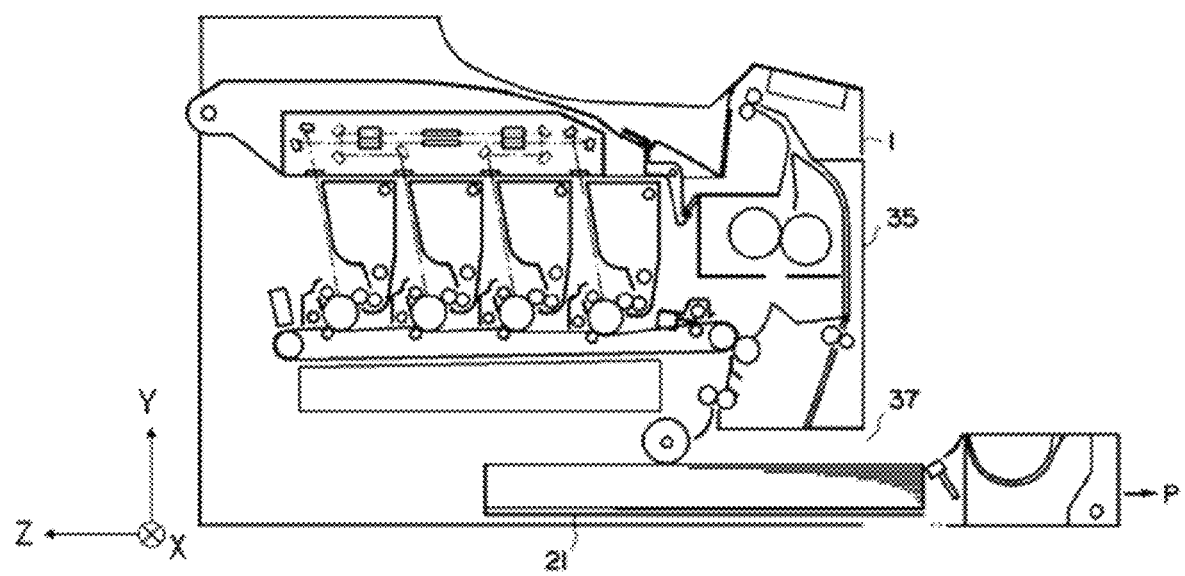
FIG. 5 is a cross-sectional view of the image forming apparatus of FIG. 4 in a state in which a part of a front cover of the image forming apparatus is opened.

FIG. 5 is a cross-sectional view of the image forming apparatus 1 of FIG. 1 in a state in which a part of the front cover is opened.

The image forming apparatus 1 includes an opening 37 to insert the sheet tray 21 into the front cover 35. The sheet tray 21 can be attached to and detached from the image forming apparatus 1 through the opening 37 in the front-rear direction (Z-axis direction) of the image forming apparatus 1. With such a configuration, a full-front operation to perform maintenance, replacement of consumables, jam processing, and the like from the front side (negative side in the Z-axis direction) of the image forming apparatus 1 can be conducted and a space for a user to perform the above-described jobs from the rear side is not necessary. Thus, an installation area of the image forming apparatus 1 can be reduced and the image forming apparatus 1 with good usability can be provided.

When the sheet tray 21 is pulled out, the image forming apparatus 1 does not perform image formation on the sheet S (by interlock). Thus, safety is ensured.

Figure 6:
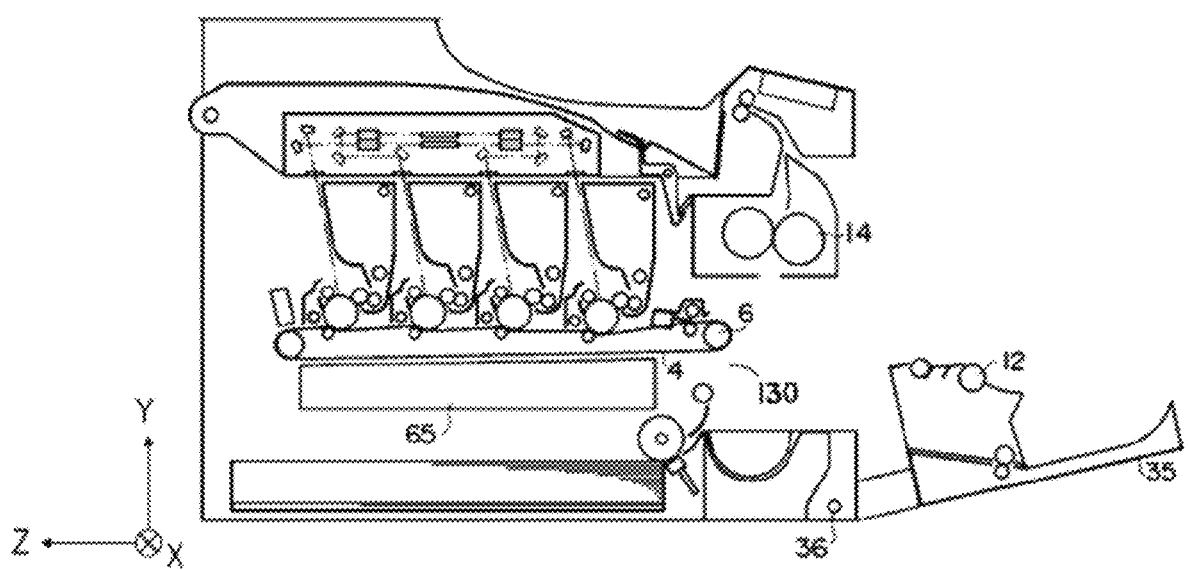
FIG. 6 is a cross-sectional view of the image forming apparatus of FIG. 4 in a state in which the front cover of the image forming apparatus is opened.

FIG. 6 is a cross-sectional view of the image forming apparatus 1 of FIG. 4 in a state in which the front cover of the image forming apparatus 1 is opened.

In the image forming apparatus 1, the front cover 35 is mounted to be openable and closable via a hinge 36. Opening the front cover 35 allows a user to perform replacement maintenance for a unit of the intermediate transfer belt 4, a waste toner bottle 65, and the fixing device 14 arranged inside the image forming apparatus 1, and processing of jammed sheets in the conveyance path 130 in the image forming apparatus 1.

Since the image forming apparatus 1 does not perform an operation of forming an image on a sheet (by interlock) when the front cover 35 is opened, safety is ensured.

FIGS. 7A, 7B, and 7C are top views of the cabinet 200 of FIG. 1 in a state in which the cabinet 200 is in use.

FIG. 7A illustrates a state in which the image forming apparatus 1 and the reading device 30 are accommodated in the cabinet 200.

In this state, a user stands in front of the image forming apparatus 1 when the user operates the image forming apparatus 1 and the user needs to move to the front of the reading device 30 when operating the reading device 30.

FIG. 7B illustrates a state in which the image forming apparatus 1 is accommodated in the cabinet 200 and the reading device 30 is pulled out from the cabinet 200 to the front side (negative side in the Z-axis direction).

In this state, the user who is in front of the image forming apparatus 1 can operate the image forming apparatus 1 in the forward direction (Z-axis direction) and operate the reading device 30 in the lateral direction (X-axis direction) without moving to the front of the reading device 30. Therefore, the operability of the image forming apparatus 1 and the reading device 30 is enhanced.

As described with reference to FIG. 3, the direction in which the ADF 76 included in the reading device 30 receives a document is a leftward direction (negative X-axis direction), and the direction in which the ADF 76 ejects a document is a rightward direction (positive side in the X-axis direction).

Accordingly, in a state in which the reading device 30 is pulled out, the user who is in front of the image forming apparatus 1 can insert a document into the ADF 76 in a lateral direction and take out the document from the ADF 76 in the lateral direction. Therefore, operability of the reading device 30 is enhanced.

FIG. 7C illustrates a state in which the reading device 30 is accommodated in the cabinet 200 and the image forming apparatus 1 is pulled out from the cabinet 200 to the front side (the negative side in the Z-axis direction).

In this state, the user can operate the pulled-out image forming apparatus 1.

FIGS. 8A and 8B are right side views of states of before and after the reading device is pulled out from the cabinet 200 of FIG. 1.

FIG. 8A illustrates a state in which the image forming apparatus 1 and the reading device 30 are accommodated in the cabinet 200.

The cabinet 200 includes a board C, a harness C1, a harness C30, and a detection device 30A. The board C is fixed to the cabinet 200. The harness C1 electrically connects the board C and the image forming apparatus 1. The harness C30 electrically connects the board C and the reading device 30. The detection device 30A detects a position of the reading device 30.

FIG. 8B illustrates a state in which the image forming apparatus 1 is accommodated in the cabinet 200 and the reading device 30 is pulled out from the cabinet 200 to the front side (the negative side in the Z-axis direction).

In this state, the detection device 30A detects that the reading device 30 has been pulled out. The board C controls the operation device 16 to rise based on the detection result of the detection device 30A. Thus, the time from when the reading device 30 has been pulled out to when the operation device 16 is operated is shortened.

As illustrated in FIG. 8B, since a user in a wheelchair can advance a support portion of legs of the wheelchair to a space below the reading device 30 pulled out forward, the user in the wheelchair can operate the reading device 30 at a position closer to the reading device 30 than in the state of FIG. 8A. Note that a user sitting on a chair can also operate the reading device 30 at a position closer to the reading device 30 in the same manner as the user in the wheelchair.

In addition, since the image forming apparatus 1 and the reading device 30 are connected to the board C by the harness C1 and the harness C30, ben the image forming apparatus 1 and the reading device 30 are pulled out from the cabinet 200, the behavior of the harness C1 and the harness C30 becomes simple and the harness W1 and the harness W2 are less likely to be entangled with each other. Thus, the reliability of the electrical connection is enhanced.

In the present embodiment, an object can be placed on the top plate 265 and the top plate 265 can be used as a worktable. Thus, both the effective use of the upper space 260 above the reading device 30 in a state in which the reading device 30 is accommodated in the cabinet 200 and the enhancement in operability of the reading device 30 in a state in which the reading device 30 is pulled out can be achieved.

FIG. 9A is a left side view. FIG. 9B is a front view, and FIG. 9C is a right side view of a state in which the image forming apparatus is pulled out from the cabinet 200 of FIG. 1. The cabinet 200 includes a partition wall 210M that partitions the first area 301 and the second area 302 of FIG. 1.

As illustrated in FIG. 9A, the guide-side left rail 241 provided on the left side (negative side in the X-axis direction) of the image forming apparatus 1 includes a guide-side upper left rail 241H and a guide-side lower left rail 241L. A fixed-side left rail 221 is provided in the cabinet 200 (internal space of the cabinet 200). The fixed-side left rail 221 is fixed to the partition wall 210M.

As illustrated in FIG. 9B, the right door 210R is rotated by 90° (in a direction parallel to the Z-axis direction) from a state in which the right door 210R is closed (in a direction parallel to the X-axis direction). The leg 214 provided at the lower end 210RB of the right door 210R is in contact with a floor surface F.

As illustrated in FIG. 9C, the guide-side right rail 240 provided on the right side (positive side in the X-axis direction) of the image forming apparatus 1 includes a guide-side upper right rail 240H and a guide-side lower right rail 240L. A fixed-side right rail 220 is provided inside (internal space) of the right side plate 200R of the cabinet 200. The fixed-side right rail 220 is fixed to the right side plate 200R.

When the image forming apparatus 1 is pulled out from the internal space of the cabinet 200 to the external space of the cabinet 200, the guide-side upper left rail 241H and the guide-side lower left rail 241L move while being guided by the fixed-side left rail 221. The guide-side upper right rail 240H and the guide-side lower right rail 240L move while being guided by the fixed-side right rail 220 and a second fixed-side rail 216 (supporter). Thus, the image forming apparatus 1 can be smoothly pulled out to the external space of the cabinet 200 in a stable posture.

When the image forming apparatus 1 is pulled out to the external space of the cabinet 200, the center of gravity of the cabinet 200 moves forward (negative side in the Z-axis direction). However, before the image forming apparatus 1 is pulled out to the external space of the cabinet 200, the leg 214 provided at the lower end 210RB of the right door 210R comes into contact with and supports the floor surface F, thus preventing the cabinet 200 from falling forward. With such an arrangement, the user can pull out the image forming apparatus 1 from the cabinet 200 and operate the pulled-out image forming apparatus 1 without worrying about falling of the cabinet 200. Therefore, the maintainability of the image forming apparatus 1 pulled out from the cabinet 200 is enhanced.

The image forming apparatus 1 sandwiches the fixed-side left rail 221 between the guide-side upper left rail 241H and the guide-side lower left rail 241L and sandwiches the fixed-side right rail 220 and the second fixed-side rail 216 between the guide-side upper right rail 240H and the guide-side lower right rail 240L in a state in which the image forming apparatus 1 is pulled out to the external space of the cabinet 200. Thus, the image forming apparatus 1 is supported by the cabinet 200 and the right door 210R. Accordingly, the image forming apparatus 1 can maintain a stable posture in the state in which the image forming apparatus 1 is pulled out to the external space of the cabinet 200.

In a state in which the image forming apparatus 1 is accommodated in the internal space of the cabinet 200, the upper frame 18 interferes with the top plate 265 and is unable to open the internal space of the image forming apparatus 1. However, pulling out the image forming apparatus 1 to the external space of the cabinet 200 allows the internal space of the image forming apparatus 1 to be opened without interfering with the top plate 265.

With the above-described configuration, opening the upper frame 18 and accessing the internal space of the image forming apparatus 1 can be performed in the state in which the image forming apparatus 1 is in the stable posture without worrying about falling of the cabinet 200.

In addition, since the second fixed-side rail 216 (supporter) that supports the image forming apparatus 1 pulled out to the external space of the cabinet 200 is provided on the right door 210R, providing a member to support the image forming apparatus 1 in the lower space 270 is not necessary. Thus, effective use of the lower space 270 can be achieved.

In the present embodiment, the right door 210R is rotatable only up to 90° from the state in which the right door 210R is closed. Accordingly, as illustrated in FIG. 9C, the fixed-side right rail 220 and the second fixed-side rail 216 can be easily coupled with each other. As another embodiment, when the right door 210R is rotatable by more than 90° from the state in which the right door 210R is closed, putting an object in and out of the lower space 270 becomes easy.

Figure 10:
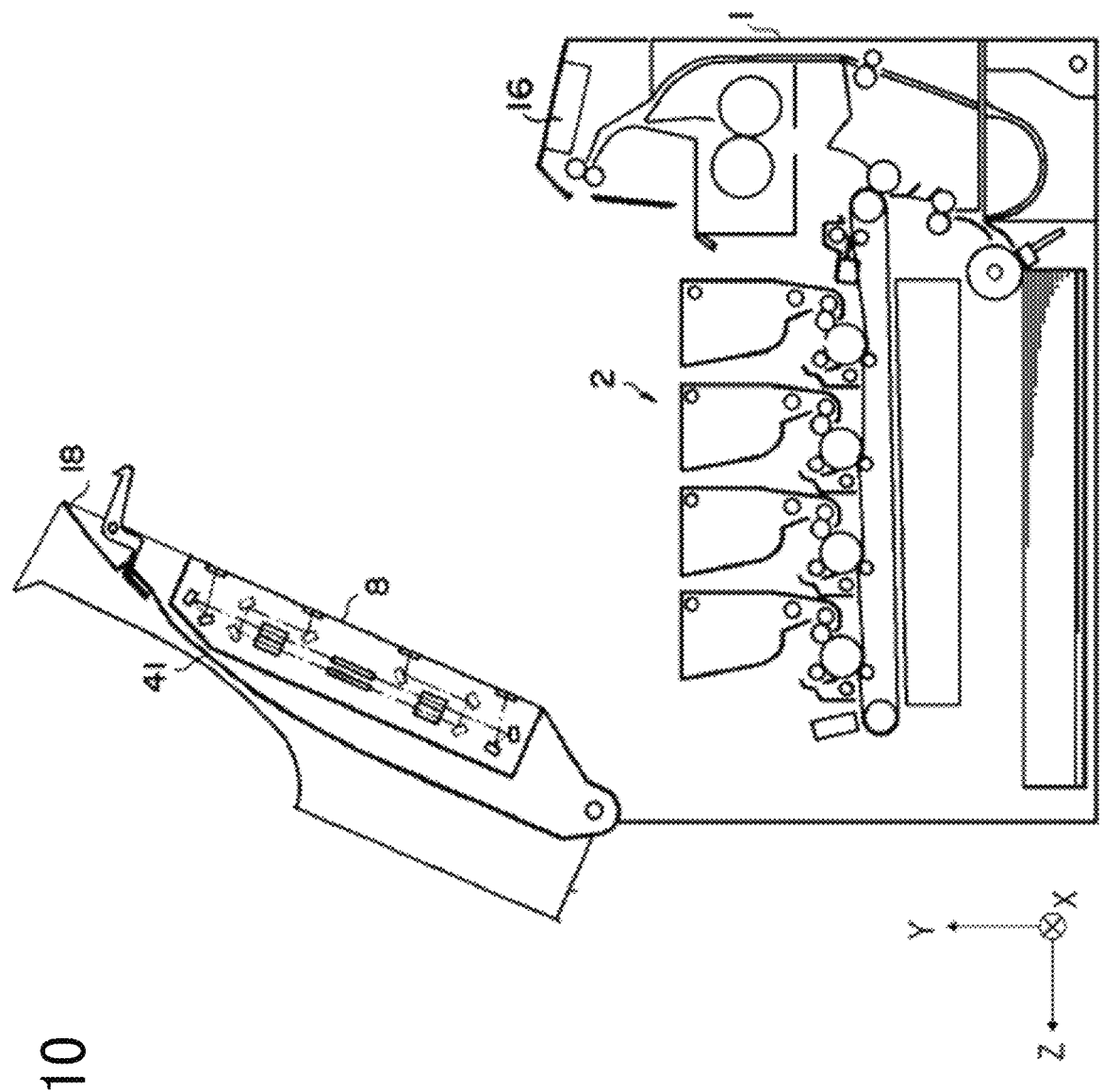
FIG. 10 is a cross-sectional view of the image forming apparatus of FIG. 4 in a state in which an upper frame of the image forming apparatus is opened.

FIG. 10 is a cross-sectional view of the image forming apparatus 1 of FIG. 4 in a state in which the upper frame 18 of the image forming apparatus 1 is opened.

When the upper frame 18 is pivoted and opened, the LSU 8 disposed in a lower part of the upper frame 18 is pivoted together. Thus, the image forming device 2 can be accessed and maintenance or the like can be easily performed. Specifically, main devices such as the photoconductors 3a to 3d, the charger 7, the developing device 9, and the cleaning device 11 of FIG. 4 can be taken out from a space in which the upper frame 18 is opened.

When the upper frame 18 is opened, the image forming apparatus 1 does not perform an image forming operation on the sheet S (by interlock). Thus, safety is ensured.

In the embodiments described above, the image forming apparatus 1 of a so-called full-color electrophotographic system is described as an example. However, the system of the image forming apparatus 1 is not limited to the full-color electrophotographic system. For example, the image forming apparatus 1 may be a monochrome electrophotographic type image forming apparatus to form a monochrome image using only black toner. The image forming apparatus 1 may be an inkjet image forming apparatus that forms an image with an inkjet head on a sheet conveyed from the sheet tray 21.

FIGS. 11, 12, 13A and 13B are explanatory views of a lock mechanism of the cabinet 200 of FIG. 1.

A lock mechanism 280 includes an upper rack 284H, a knob 285, and an upper pinion 282H. The upper rack 284H is movable in the left-right direction (X-axis direction). The knob 285 operates the upper rack 284H to move the upper rack 284H in the left-right direction (X-axis direction). The upper pinion 282H rotates in conjunction with the movement of the upper rack 284.

Further, the lock mechanism 280 includes a rotation shaft 286, a lower pinion 282L, and a lower rack 284L. The rotation shaft 286 is coupled with the upper pinion 282H. The lower pinion 282L is coupled with the rotation shaft 286 and rotates in conjunction with the rotation of the upper pinion 282H. The lower rack 284L is movable in the left-right direction (X-axis direction) in conjunction with the rotation of the lower pinion 282L. In the present embodiment, the knob 285 is provided on the upper rack 284H. However, the knob 285 may be provided on the lower rack 284L.

The upper pinion 282H is rotatably supported by the partition wall 210M of FIG. 9B. The upper rack 284H is attached to the partition wall 210M and a fixed wall mounted below the mounting table 290 of FIG. 2 so as to be slidable in the left-right direction (X-axis direction). The lower rack 284L is attached to the partition wall 210M and an upper wall forming an upper portion of the lower space 270 of FIG. 2 so as to be slidable in the left-right direction.

Further, a rail on the structural body of the cabinet 200 that slides on the right rail 295R is fixed to the partition wall 210M. Another rail on the structural body of the cabinet 200 that slides on the left rail 295L is fixed to the left side plate 200L of FIG. 9.

An operator can move the upper rack 284H in the left-and-right direction by holding the knob 285 of the upper rack 284H. However, a meshing portion of the upper rack 284H and a gear of the upper pinion 282H are meshed with each other by the operation. Accordingly, the rotation operation of the upper rack 284H and the upper pinion 282H moves in conjunction with the lower pinion 282L through the rotation shaft 286 to move the lower rack 284L in the left-and-right direction.

Figure 11:
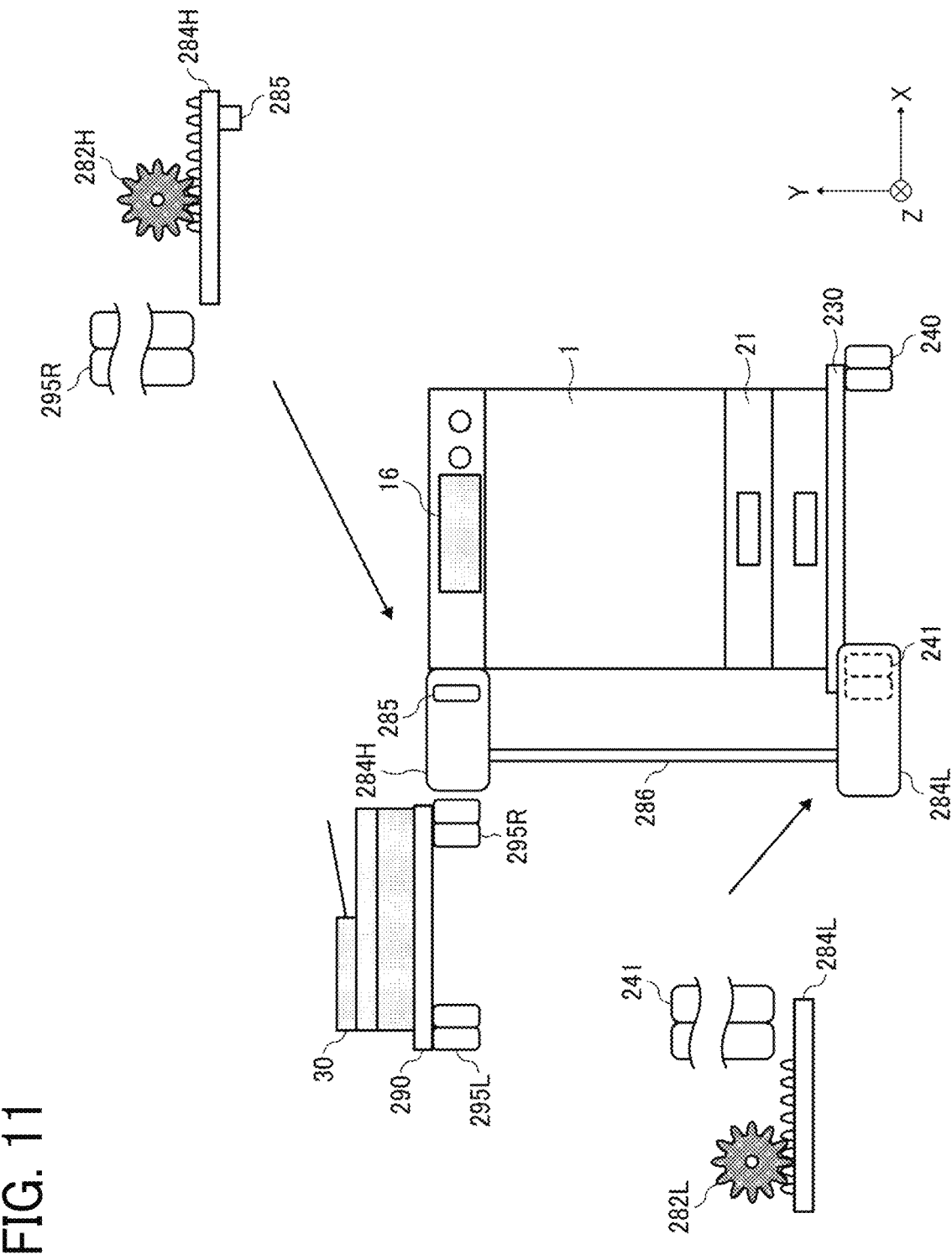
FIG. 11 is a schematic view of a lock mechanism of the cabinet of FIG. 1.

FIG. 11 illustrates a state in which the lock mechanism 280 allows the right rail 295R to move and prevents the guide-side left rail 241 from moving.

Operating the knob 285 allows the upper rack 284H to move between a position at which the upper rack 284H prevents the right rail 295R from moving forward (in the negative side in the Z-axis direction) and a position at which the upper rack 284H allows the right rail 295R to move forward (in the negative side in the Z-axis direction). In the state illustrated in FIG. 11, the upper rack 284H is at a position in which the upper rack 284H allows the right rail 295R to move forward (in the negative side in the Z-axis direction).

Operating the knob 285 allows the lower rack 284L to move, via the upper rack 284H, the upper pinion 282H, and the lower pinion 282L, between a position at which the lower rack 284L prevents the guide-side left rail 241 from moving forward (in the negative side in the Z-axis direction) and a position at which the lower rack 284L allows the guide-side left rail 241 to move forward (in the negative side in the Z-axis direction). In the state illustrated in FIG. 10A, the lower rack 284L is at a position at which the lower rack 284L prevents the guide-side left rail 241 from moving forward (in the negative side in the Z-axis direction).

Figure 12:
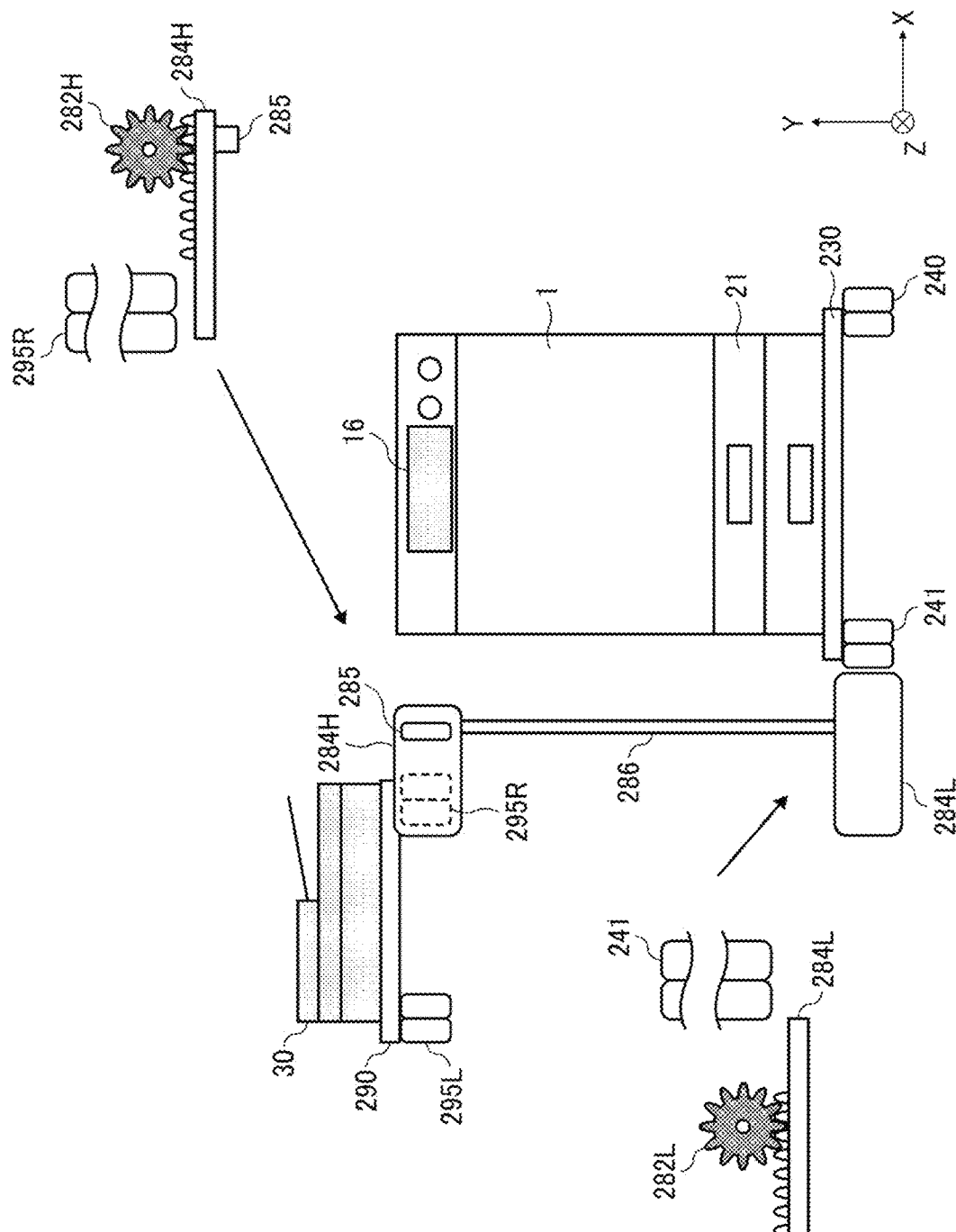
FIG. 12 is a second schematic view of the lock mechanism of the cabinet of FIG. 1.

FIG. 12 illustrates a state in which the lock mechanism 280 prevents the right rail 295R from moving and allows the guide-side left rail 241 to move.

The upper rack 284H is at a position at which the upper rack 284H prevents the right rail 295R from moving forward (in the negative side in the Z-axis direction).

The lower rack 284L is at a position at which the lower rack 284L allows the guide-side left rail 241 to move forward (in the negative side in the Z-axis direction).

Providing the lock mechanism 280 as described above allows both the reading device 30 and the image forming apparatus 1 to be pulled out. Thus, the cabinet 200 can be prevented from falling. Therefore, one of the reading device 30 and the image forming apparatus 1 can be pulled out from the cabinet 200 and operated without worrying about falling of the cabinet 200. Thus, the operability of the reading device 30 or the image forming apparatus 1 pulled out from the cabinet 200 is enhanced.

Figure 14A:
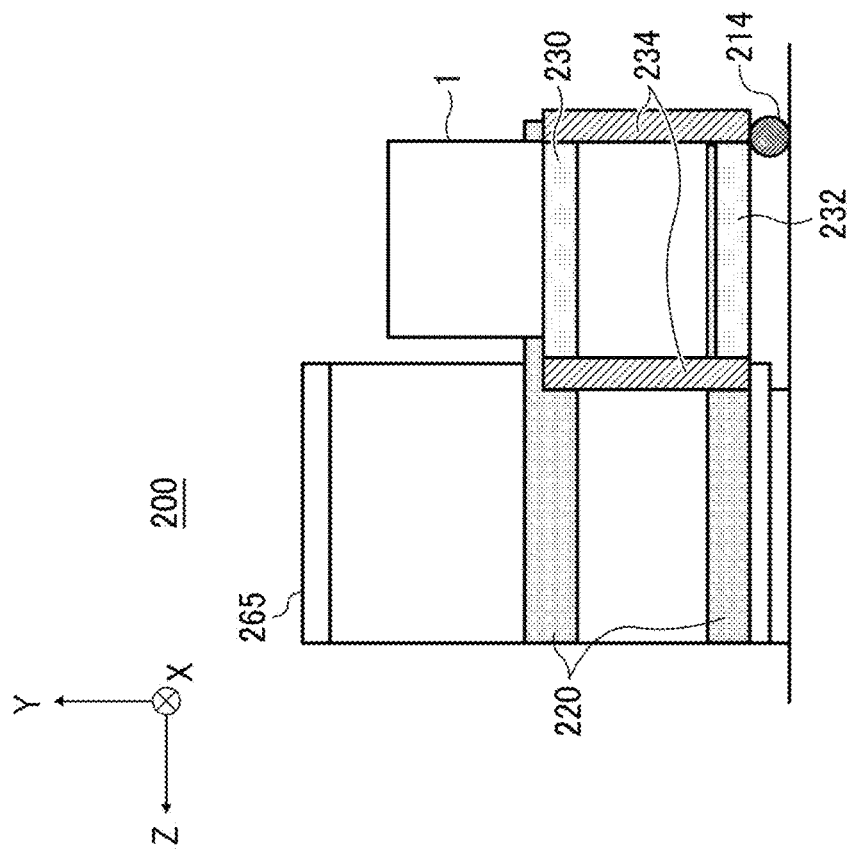
FIGS. 14A and 14B are left-side views of a modification of the cabinet of FIG. 1.
Figure 14B:
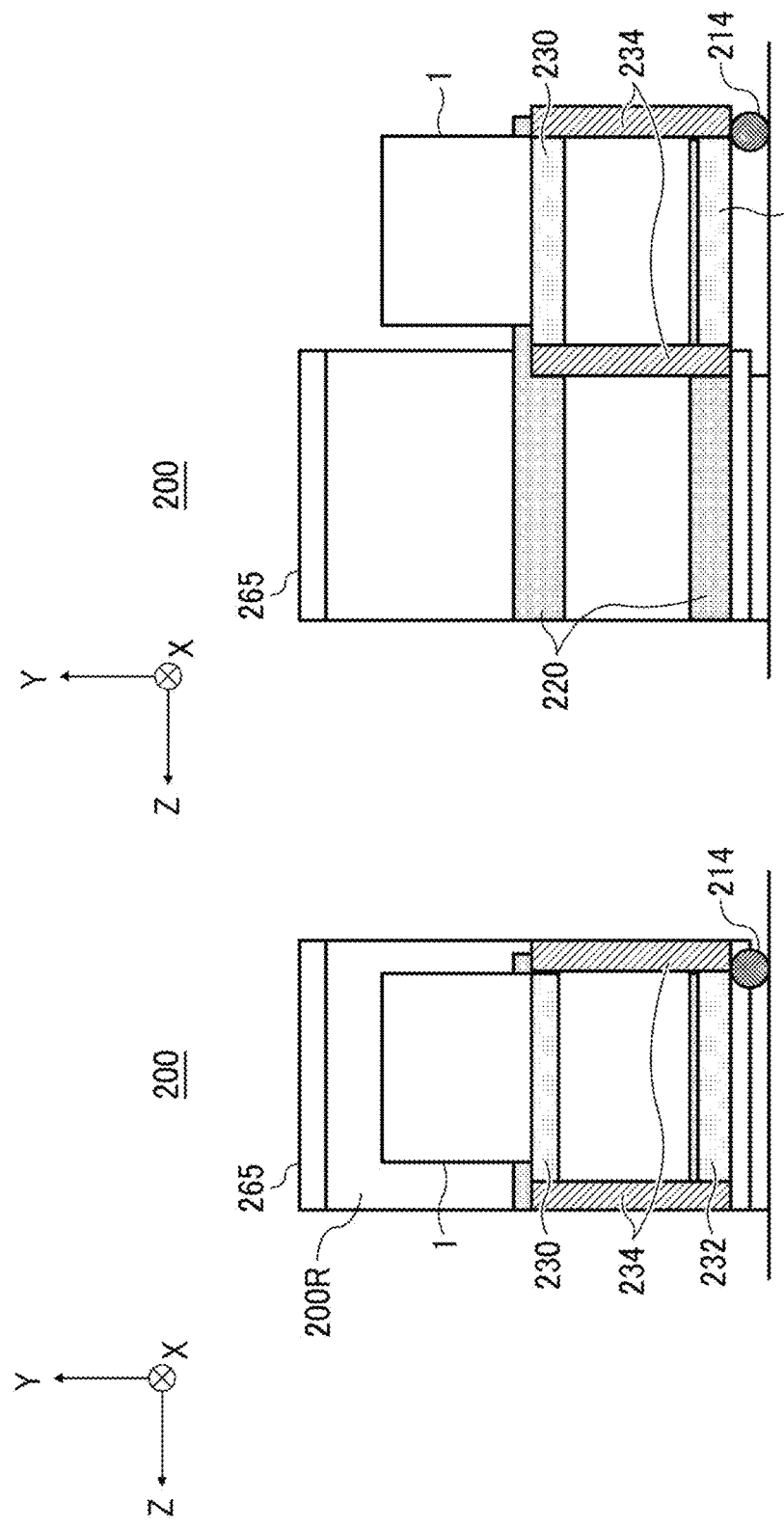

FIGS. 14A and 14B are left-side views of a modification of the cabinet 200 of FIG. 1.

The image forming apparatus 1 is mounted on the mounting table 230. The mounting table 230 is connected to a lower member 232 via connectors 234, and the leg 214 is provided below the lower member 232.

Thus, the mounting table 230 is guided, while mounting the image forming apparatus 1, by the fixed-side right rail 220 and can be pulled out from the internal space of the cabinet 200 to the external space (negative side in the Z-axis direction). With such a configuration, the image forming apparatus 1 can be pulled out from the cabinet 200 and operated.

In the above-described modification and embodiments described above, the cabinet 200 in which the image forming apparatus 1 is accommodated, which forms an image on a sheet, has been described. However, in other embodiments, the image forming apparatus 1 that forms an image on a sheet may be referred to as an image forming apparatus body, and the cabinet 200 may be referred to as an image forming apparatus.

As described above, in the cabinet 200 according to an embodiment of the present disclosure, the first area 301 and the second area 302 arranged in the horizontal direction are formed. The image forming apparatus 1 that forms an image on a sheet and ejects the sheet on which the image has been formed is accommodated in the first area 301. The reading device 30 that reads an image of a document is accommodated in the second area 302. The reading device 30 can be pulled out from the cabinet 200 in the direction orthogonal to the direction in which the first area 301 and the second area 302 are arranged in the horizontal plane.

Accordingly, in the state in which the reading device 30 is pulled out, the user who is in front of the image forming apparatus 1 can operate the image forming apparatus 1 in the forward direction and operate the reading device 30 in the lateral direction without moving to the front of the reading device 30. Thus, the operability of the image forming apparatus 1 and the reading device 30 is enhanced.

The cabinet 200 includes the top plate 265 disposed above the reading device 30 via the upper space 260. The top plate 265 includes a flat upper surface. Accordingly, since an object can be placed on the top plate 265 and the top plate 265 can be used as a worktable, both the effective use of the upper space 260 above the reading device 30 in a state in which the reading device 30 is accommodated and the enhancement in operability of the reading device 30 in a state in which the reading device 30 is pulled out can be achieved.

The reading device 30 includes the ADF 76 that conveys a document and reads an image of the conveyed document. The direction in which the ADF 76 receives the document is the direction from the first area 301 toward the second area 302. The direction in which the ADF 76 ejects the document is the direction from the second area 302 toward the first area 301.

Accordingly, in the state in which the reading device 30 is pulled out, a user who is in front of the image forming apparatus 1 can insert a document into the ADF 76 in the lateral direction and take out the document from the ADF 76 in the lateral direction. Thus, the operability of the reading device 30 is enhanced.

The reading device 30 includes the ADF 76. In addition, the reading device 30 may read a document placed on the exposure glass 73. Or, the reading device 30 may include only the ADF 76.

The image forming apparatus 1 can be pulled out from the internal space to the external space of the cabinet 200. The image forming apparatus 1 includes the lock mechanism 280 that prohibits a state in which both the reading device 30 and the image forming apparatus 1 are pulled out.

Thus, the cabinet 200 can be prevented from falling by pulling out both the reading device 30 and the image forming apparatus 1. Therefore, one of the reading device 30 and the image forming apparatus 1 can be pulled out from the cabinet 200 and operated without worrying about falling of the cabinet 200. Thus, the operability of the reading device 30 or the image forming apparatus 1 pulled out from the cabinet 200 is enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure.

What is claimed is:

1. A cabinet comprising:
a first area and a second area arranged in a horizontal direction;
an image forming apparatus in the first area, the image forming apparatus being configured to form an image on a sheet and eject the sheet with the image; and
a reading device in the second area, the reading device being configured to read an image of a document,
wherein at least a part of the reading device is configured to be pulled out from an internal space of the cabinet in a direction orthogonal to the horizontal direction in which the first area and the second area are arranged in a horizontal plane.

2. The cabinet according to claim 1, further comprising a top plate above the reading device via an upper space of the cabinet.

3. The cabinet according to claim 2,
wherein the reading device includes a document feeder configured to convey a document and read an image of the conveyed document,
wherein a direction in which the document feeder receives the document is a direction from the first area toward the second area, and
wherein a direction in which the document feeder ejects the document is a direction from the second area toward the first area.

4. The cabinet according to claim 3, further comprising a lock mechanism,
wherein the image forming apparatus is configured to be pulled out from the internal space of the cabinet to an external space of the cabinet, and
wherein the lock mechanism is configured to prevent both the reading device and the image forming apparatus from being pulled out from the internal space of the cabinet.

5. The cabinet according to claim 2, further comprising a lock mechanism,
wherein the image forming apparatus is configured to be pulled out from the internal space of the cabinet to an external space of the cabinet, and
wherein the lock mechanism is configured to prevent both the reading device and the image forming apparatus from being pulled out from the internal space of the cabinet.

6. The cabinet according to claim 2, further comprising a lock mechanism,
wherein the reading device includes a document feeder configured to convey a document and read an image of the conveyed document,
wherein a direction in which the document feeder receives the document is a direction from the first area toward the second area,
wherein a direction in which the document feeder ejects the document is a direction from the second area toward the first area,
wherein the image forming apparatus is configured to be pulled out from the internal space of the cabinet to an external space of the cabinet, and
wherein the lock mechanism is configured to prevent both the reading device and the image forming apparatus from being pulled out from the internal space of the cabinet.

7. The cabinet according to claim 1,
wherein the reading device includes a document feeder configured to convey a document and read an image of the conveyed document,
wherein a direction in which the document feeder receives the document is a direction from the first area toward the second area, and
wherein a direction in which the document feeder ejects the document is a direction from the second area toward the first area.

8. The cabinet according to claim 1, further comprising a lock mechanism,
wherein the image forming apparatus is configured to be pulled out from the internal space of the cabinet to an external space of the cabinet, and
wherein the lock mechanism is configured to prevent both the reading device and the image forming apparatus from being pulled out from the internal space of the cabinet.

9. An image forming system comprising:
an image forming apparatus configured to form an image on a sheet and eject the sheet with the image; and
a cabinet configured to accommodate the image forming apparatus, the cabinet including:
  a first area and a second area arranged in a horizontal direction;
  the image forming apparatus in the first area; and
  a reading device in the second area, the reading device being configured to read an image of a document,
  wherein at least a part of the reading device is configured to be pulled out from the cabinet in a direction orthogonal to the horizontal direction in which the first area and the second area are arranged in a horizontal plane.

\* \* \* \* \*